United States Patent [19]

Shih

[11] Patent Number: 5,982,149
[45] Date of Patent: Nov. 9, 1999

US005982149A

[54] DEVICE OF A MICRO MOBILE PHONE BATTERY CHARGER

[76] Inventor: Hung-Ming Shih, 5F No. 487, Da Yu Road, Taoyuan City, Taiwan

[21] Appl. No.: 09/205,356

[22] Filed: Dec. 4, 1998

[51] Int. Cl.$^6$ .................................................. H02J 7/00
[52] U.S. Cl. ........................................ 320/134; 320/128
[58] Field of Search ................................... 320/134, 138, 320/139

[56] References Cited

U.S. PATENT DOCUMENTS

| | | | |
|---|---|---|---|
| 3,849,677 | 11/1974 | Stacey et al. | 327/552 |
| 4,873,712 | 10/1989 | Poreo | 455/572 |
| 5,347,164 | 9/1994 | Yeh | 307/66 |
| 5,479,486 | 12/1995 | Saji | 320/115 |
| 5,525,892 | 6/1996 | Phommarath | 320/139 |
| 5,847,545 | 12/1998 | Chen et al. | 320/138 |

Primary Examiner—Peter S. Wong
Assistant Examiner—Lawrence Luk
Attorney, Agent, or Firm—Bacon & Thomas

[57] ABSTRACT

A micro mobile phone battery charger for nickel hydrogen and lithium ion batteries, having advantages of high charging efficiency, quick charging, being adaptable for use with different voltages, and compactness. includes a casing, a rotary concealable charger plug, an internal circuit device, and battery terminals arranged to retain the battery in the housing and eliminate the need for lead wires. The internal circuit device, includes an overload, over-voltage protection circuit, an electromagnetic interference filter circuit, a voltage stabilizing circuit, an oscillation circuit, a direct current rectifying circuit, a car charge direct current input protection circuit, an alternating current filter circuit, a detection circuit, and an automatic power interruption system. The current is automatically adapted so that the input voltage range is from 90 to 250V to adapt to municipal currents of 110 to 240V and car charging.

5 Claims, 4 Drawing Sheets

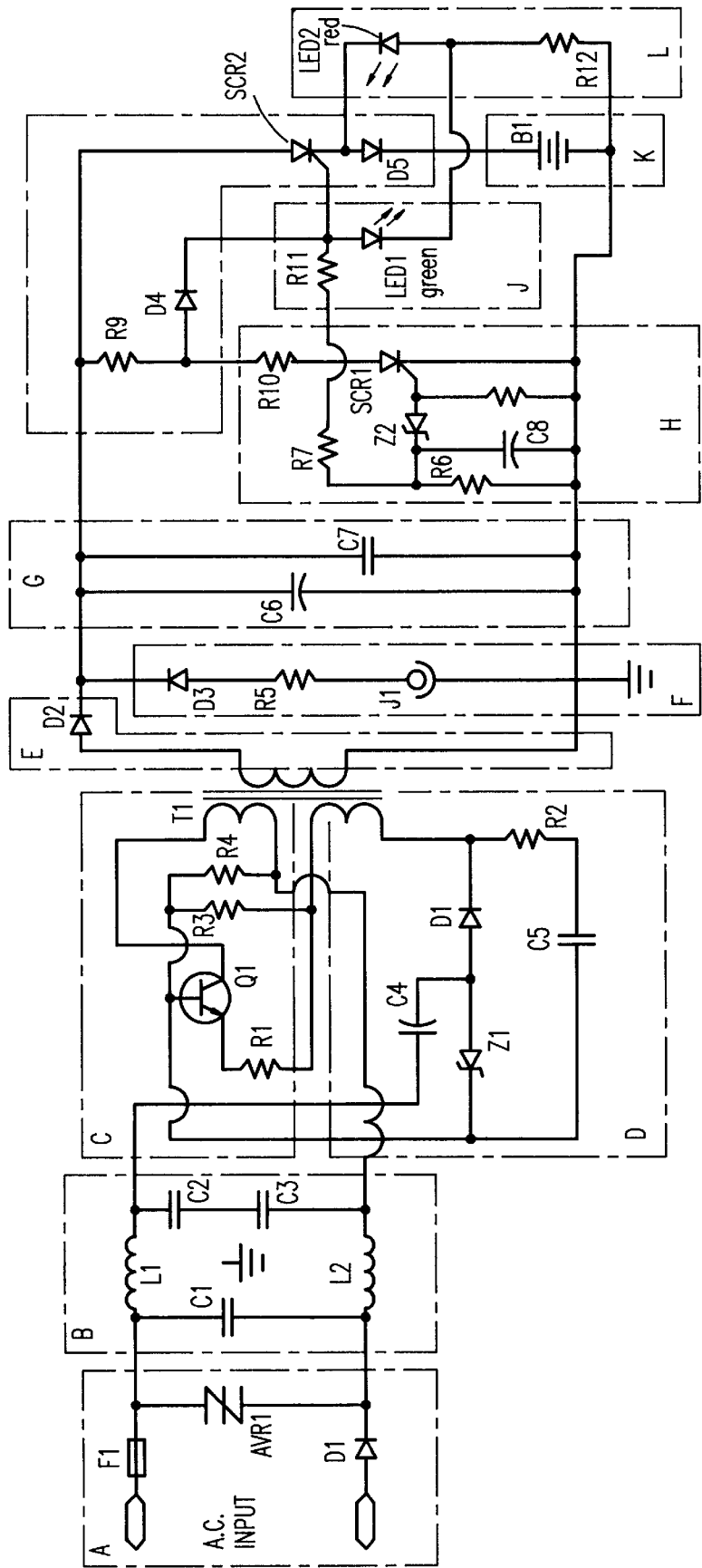
FIG. 4 —(3)

DEVICE OF A MICRO MOBILE PHONE BATTERY CHARGER

BACKGROUND OF THE INVENTION (a) Field of the Invention

The present invention relates to an improved device of a micro mobile phone battery charger, and more particularly to a charger that is very compact to facilitate carrying, and that has a circuitry to enable the charger to automatically adapt to different voltages, and that is especially adapted for using car electricity and municipal electricity. In addition, the present invention is adapted for use with nickel hydrogen and lithium ion batteries, so that there is no need to discharge electricity prior to charging and there are no adverse memory effects.

(b) Description of the Prior Art

Mobile phones are very popular today. The mobile phone is used in conjunction with a charger so that it has sufficient power supply to enable it to be used at any time. However, conventional chargers are usually bulky and, due to various restrictions, has the following disadvantages:

1. As the conventional charger cannot adapt to different voltages, it cannot be used in countries where the voltage is different.
2. As the conventional charger is equipped with a lead wire for recharging purposes, the wire may get entangled. It is also troublesome to assemble and connect the lead wire.
3. The conventional charger can only charge nickel cadmium batteries and cannot effectively identify the types of batteries, which is impractical.
4. As the conventional charger does not have a protection circuit, when the batteries are fully charged, it will not automatically turn off.
5. Referring to Item 4 above, since the conventional charger does not include a protection circuit, when the batteries are fully charged, the temperature may rise, which will consume more power and may damage the internal components to shorten their useful life.
6. The conventional charger is not provided with an electromagnetic interference filter circuit. Therefore, it cannot effectively avoid interference of electric currents and voltages.

SUMMARY OF THE INVENTION

A primary object of the present invention is to provide an improved micro mobile phone battery charger, which eliminates the user of lead wires in conventional chargers and which utilizes a rotary concealable charger plug to connect directly to an electrical socket. The present invention is very compact and can adapt to different voltages as well as use car electricity.

According to the present invention, the improved micro mobile phone battery charger comprises a casing, a rotary concealable charger plug, and an internal circuit device. The circuit device includes an overload, over-voltage protection circuit, an electromagnetic interference filter circuit, a voltage stabilizing circuit, an oscillation circuit, a direct current rectifying circuit, a car charge direct current input protection circuit, an alternating current filter circuit, a detection circuit, and an automatic power interruption system. The advantages achievable by the present invention are:

1. The greatest output current of the present charger is 250 mA. Charging is quick, and efficiency is high. The voltage can be adapted within the range of 90 to 250 V, and will not be restricted to any voltage environment. The present invention can be used in any country.
2. The present invention can be used to charge nickel hydrogen or lithium ion batteries, which is an improvement over the prior art which can charge only a single type of battery. The present invention additionally has a delay identifying circuit and can identify nickel hydrogen or lithium ion batteries before proceeding with the charging process.
3. The present invention is equipped with an over-charging protection circuit. When the battery is fully charged, the present invention will automatically turn off and charging will stop to protect the batteries.
4. The present invention has an output protection circuit, so that there is no electricity leakage at the output end.
5. The present invention is provided with an E.M.I. filter circuit, so that it can prevent interference due with electric currents and voltages used by household electrical appliances.
6. As the power consumed by the present invention is only 40 mW, the temperature of the components will not rise, thus prolonging the service life of the present invention.
7. The present invention can utilize municipal electricity and car electricity for recharging purposes, which is very practical compared to the prior art.

BRIEF DESCRIPTION OF THE DRAWINGS

The foregoing and other features and advantages of the present invention will be more clearly understood from the following detailed description and the accompanying drawings, in which.

FIG. 4 is a detailed structural view of the entire circuit of the present invention.

DETAILED DESCRIPTION OF THE PREFERRED EMBODIMENT

Figure 1:
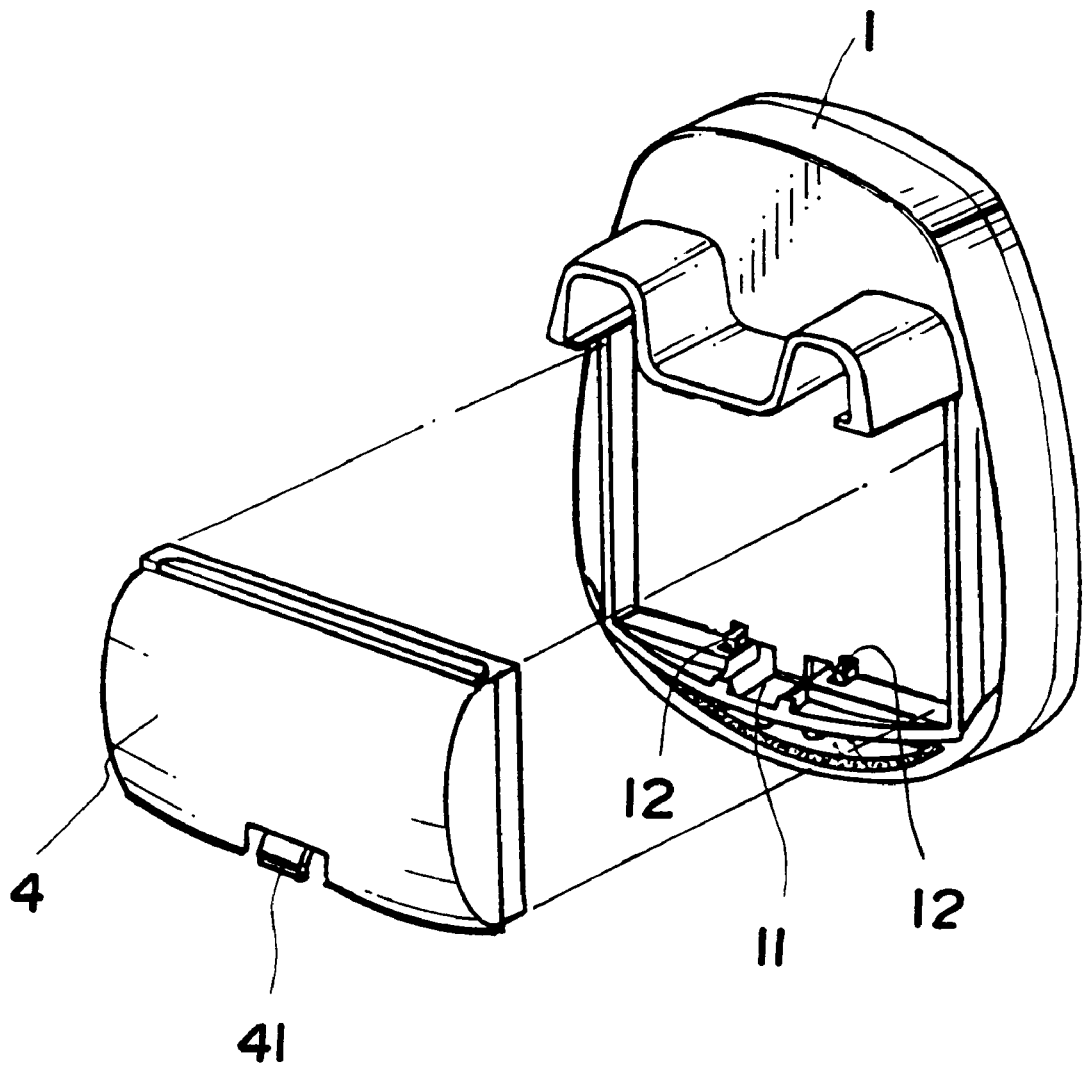
FIG. 1 is an exploded schematic view of a preferred embodiment of the present invention used in conjunction with a battery.
Figure 2:
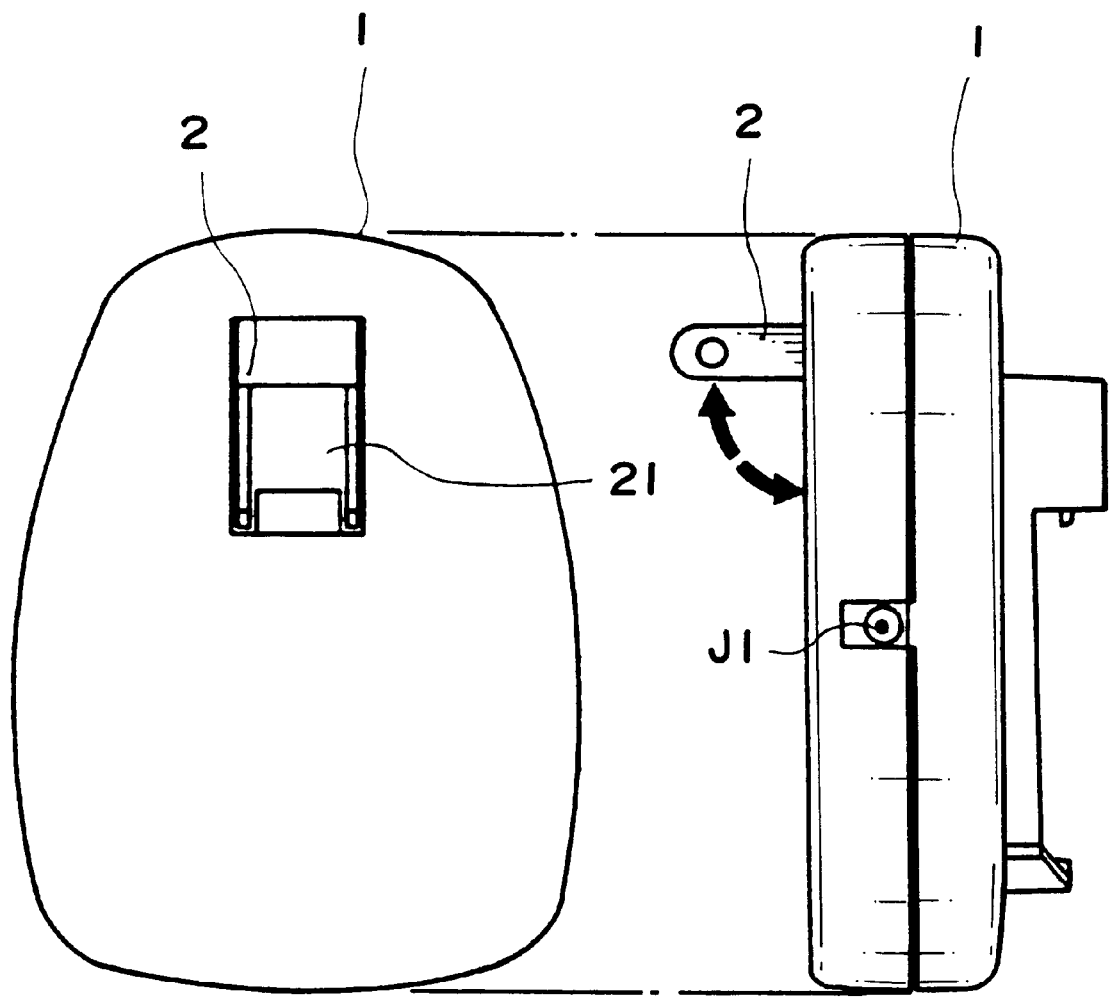
FIG. 2 is a schematic view of the rear side of the preferred embodiment of the present invention.

Referring to FIGS. 1 and 2, the present invention is directed to a micro charger, and in particular to a micro charger that can be used to charge various types of chargeable batteries commonly available on the market. The present invention includes a casing 1, a rotatable concealable charger plug 2, a car charge direct current input J1, and an internal circuit device 3. The front side of the casing 1 has a retaining groove 11 arranged to receive a projection 41 of a battery 4 engage the retaining groove 11 quickly to couple the battery 4 to the casing 1, whereby a conductive plate 12 on the casing 1 can be pressed to achieve charging. Referring to FIG. 2, which shows a rear side of the casing 1. The charger plug 2 is disposed on the rear side of the casing 1. The charger plug is connected to the internal circuit device 3 to serve as a power input end of the circuit device. The charger plug 2 can be rotated about 90 degrees to a position at which it can be inserted into an electrical socket. Hence, it can be appreciated that the charger together with the battery 4 can be directly connected to the power source by means of the charger plug 2, without the need of use for a lead wire and an adapter. In addition, when not in use, the charger plug 2 can be rotated and concealed in a recess 21 on the rear side of the casing 1 flush with the surface of the casing so as to save space.

Figure 3:
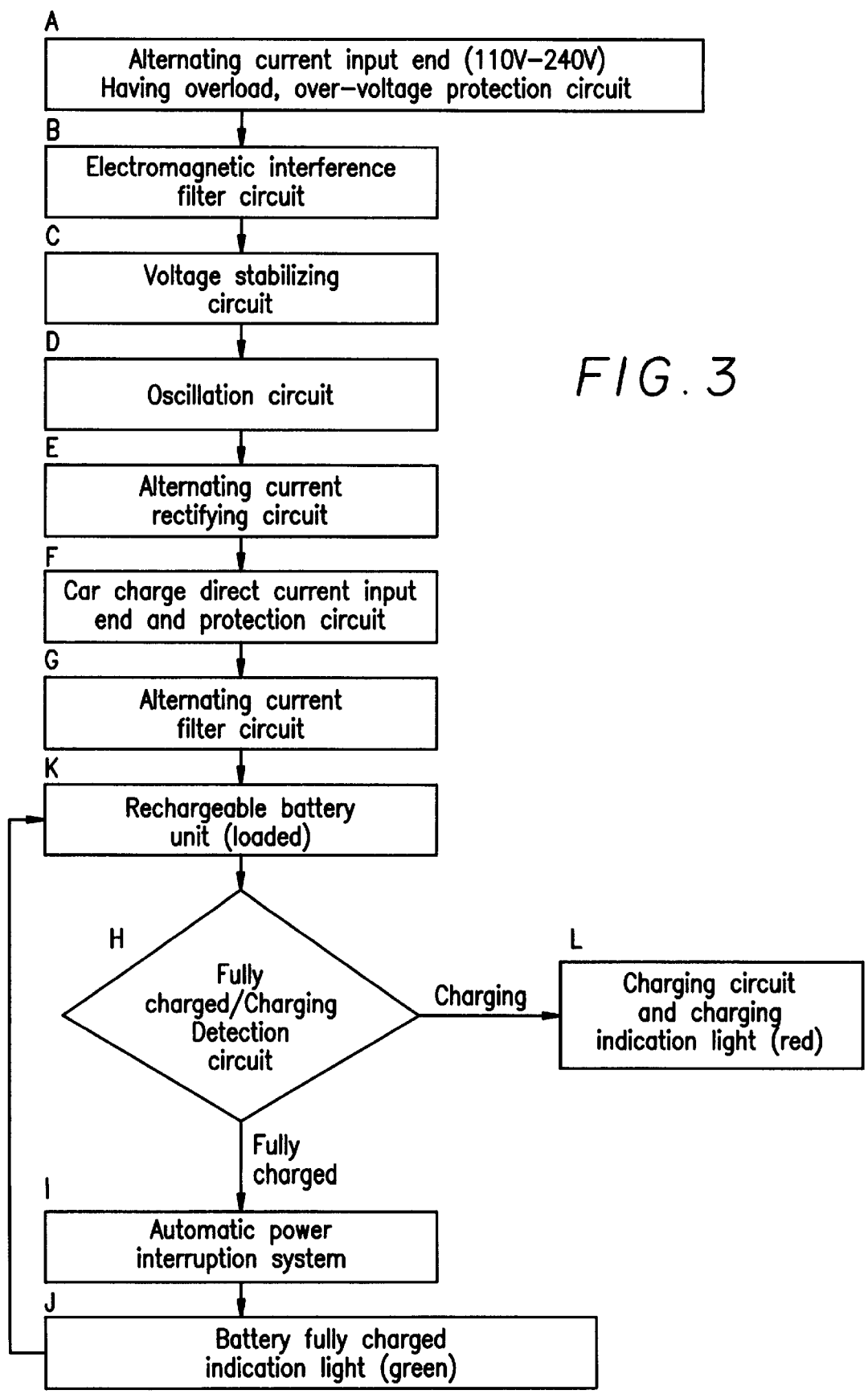
FIG. 3 is a flowchart of the internal circuit according to the present invention.

With reference to FIGS. 3 and 4, the circuit device 3 according to the present invention includes an overload, over-voltage protection circuit A, an electromagnetic interference filter circuit B, a voltage stabilizing circuit C, an oscillation circuit D, a direct current rectifying circuit E, a car charge direct current input end protection circuit F, an alternating current filter circuit G, a detection circuit H, and an automatic power interruption system 1, in which:

A: Alternating current is input from the charger plug 2. The voltages may range from 110 V to 240 V. F1 performs overload protection, whereas AVR1 and F1 perform over-voltage protection;

B: Then, C1, L1, L2 performs electromagnetic interference filter handling;

C: Transistors Q1, and R1, R3, R4 form a voltage stabilizing circuit, the on or off signals being determined based on the wave curve of the oscillation circuits.

D: Z1, D1, C4 and R2 form an oscillation circuit to switch the transistor Q1 on or off;

E: Subsequently, the voltage is reduced to the desired level by T1 and rectified by D2;

F: J1 of the circuit is the car charge direct current input end, using D3 as a reverse voltage protection;

G: This is the alternating filter circuit, using C6 as a smoothing filter capacitor:

H: This is the detection circuit used to detect whether the battery is fully charged or not;

I: This is the automatic power interruption system. When the detection circuit detects that the battery is fully charged, SC2 will start action to cut off power supply, thereby stopping charging and protecting the battery.

J: This is a charge saturation indicating circuit. When the battery is fully charged, green light LED1 is activated. But the detection circuit will continue to detect the battery voltage and electric current amount. When it is smaller than a certain value, charging will continue. Otherwise, the power will continue to be off. Detection will continue in this mode until the battery is removed from the charger;

K: This is an ordinary chargeable battery unit which serves as a load on the circuit;

L: If the detection circuit detects that the circuit is not in a saturated state, charging will continue, and illuminate red light LED2 red light.

By means of the above circuit device 3, the present invention not only has the advantages of quick and efficient charging, it can be adapted for voltages in the range from 90 to 250 V, not being restricted by any voltage environment. The present invention can be used in any country and is therefore very practical. In particular, the present invention eliminates the use of lead wires, adapters, or other accessories. It can therefore appreciated that the present invention provides a substantive improvement over the prior art.

In summary, the present invention is highly practical and has multiple effects. It is also simple in construction, easy and safe to operate.

Although the present invention has been illustrated and described with reference to the preferred embodiment thereof, it should be understood that it is in no way limited to the details of such embodiment but is capable of numerous modifications within the scope of the appended claims.

What is claimed is:

1. A mobile phone battery charger, comprising:

a casing having opposite first and second sides;

a charger plug mounted to the first side of said casing and arranged to be rotated from a position in which the charger plug is concealed in said casing to a position in which the charger plug extends from the casing and therefore can be inserted into an electrical outlet through which alternating current is input to the charger;

a DC power input jack;

an internal circuit device connected to said charger plug and to said direct current input jack, and battery contacts connected to said internal circuit device and extending from said second side of the casing, said contacts being arranged to engage terminals on a mobile phone battery pack in order to establish a charging connection between said internal circuit device and a battery in said battery pack when said battery pack is fitted between said contacts on said second side of the casing, wherein said internal circuit device comprises:

(A) AC power input means coupled to the charger plug for filtering and rectifying AC power input through said charger plug, said AC power input means comprising:
  (a) an over-voltage protection circuit coupled to the charger plug, said over-voltage protection circuit;
  (b) an electromagnetic interference filter coupled to the protection circuit and arranged to absorb high frequency transients resulting from electromagnetic interference;
  (c) a voltage stabilizing circuit coupled to an output of the electromagnetic interference filter;
  (d) a rectifying circuit coupled to the voltage stabilizing circuit;

(B) a common node connected to an output of said rectifying circuit and to said DC power input jack;

(C) a smoothing filter between said common node and said battery contacts and arranged to output a charging current to a battery connected to said battery contacts;

(D) a charge detection circuit also coupled to said battery contacts and arranged to detect whether a battery in said battery pack is fully charged; and (E) a power interruption system connected to the charge detection circuit and arranged interrupt a supply of power from said smoothing filter to said battery contacts when said battery is fully charged.

2. A mobile phone battery charger as claimed in claim 1, wherein said over-voltage protection circuit includes a resistor connected to one of said prongs and a zener diode connected in parallel between said prongs and arranged to prevent excess voltages from being input through said prongs.

3. A mobile phone battery charger as claimed in claim 1, further comprising an oscillator circuit, and wherein said voltage stabilizing circuit includes a transistor switched on and off by an oscillator.

4. A mobile phone battery charger as claimed in claim 1, wherein said power interruption system comprises a silicon controlled rectifier device having a control input connected to an output of the charge detection circuit.

5. A mobile phone battery charger as claimed in claim 1, further comprising a diode connected between the DC current input jack and said common node to provide reverse voltage protection.

* * * * *